US008650126B2

(12) United States Patent
Kwan

(10) Patent No.: US 8,650,126 B2
(45) Date of Patent: Feb. 11, 2014

(54) METHOD, APPARATUS AND PROGRAM TO MAKE PAYMENT IN ANY CURRENCIES THROUGH A COMMUNICATION NETWORK SYSTEM USING PRE-PAID CARDS

(76) Inventor: Khai Hee Kwan, Sydney (AU)

( * ) Notice: Subject to any disclaimer, the term of this patent is extended or adjusted under 35 U.S.C. 154(b) by 1381 days.

(21) Appl. No.: 09/396,005

(22) Filed: Sep. 13, 1999

(65) Prior Publication Data

US 2003/0200179 A1    Oct. 23, 2003

(30) Foreign Application Priority Data

Aug. 11, 1999 (AU) ................................. 43506/99

(51) Int. Cl.
 *G06Q 30/00* (2012.01)
 *G06Q 30/04* (2012.01)
(52) U.S. Cl.
 USPC ........ 705/51; 705/14.1; 705/14.2; 705/14.12; 705/14.13
(58) Field of Classification Search
 USPC ............. 705/1, 41, 69, 43, 39, 14, 26, 44, 59, 705/51; 379/144
 See application file for complete search history.

(56) References Cited

U.S. PATENT DOCUMENTS

| | | | | |
|---|---|---|---|---|
| 5,122,950 A | * | 6/1992 | Benton et al. | 705/44 |
| 5,350,906 A | * | 9/1994 | Brody et al. | 235/379 |
| 5,455,407 A | * | 10/1995 | Rosen | 705/69 |
| 5,530,232 A | * | 6/1996 | Taylor | 235/380 |
| 5,577,109 A | * | 11/1996 | Stimson et al. | 379/114.2 |
| 5,659,165 A | * | 8/1997 | Jennings et al. | 235/379 |
| 5,923,734 A | * | 7/1999 | Taskett | 379/114.18 |
| 5,937,396 A | * | 8/1999 | Konya | 705/43 |
| 5,963,647 A | * | 10/1999 | Downing et al. | 705/39 |
| 6,098,053 A | * | 8/2000 | Slater | 705/44 |
| 6,138,106 A | * | 10/2000 | Walker et al. | 705/14.1 |
| 6,279,824 B1 | * | 8/2001 | Park | 235/379 |
| 6,424,706 B1 | * | 7/2002 | Katz et al. | 379/144.01 |
| 7,089,208 B1 | * | 8/2006 | Levchin et al. | 705/39 |
| 2003/0050831 A1 | * | 3/2003 | Klayh | 705/14 |

OTHER PUBLICATIONS

David, US PAtent Application Publication No. US 2002/0073046 A1; Pub Jun. 13, 2002, Filed Jun. 6, 2001, Effective USC 35 §102(e) date Jul. 30, 1999.*

* cited by examiner

*Primary Examiner* — Evens J Augustin

(57) ABSTRACT

This is a pre-paid card system used to store monetary value and subsequently for making payment to merchants through the telephone system or through a data network. Unlike static credit card numbers, this invention employs the generation of encrypted dynamic codes for each transaction, which must be verified within a specific time, for payment initiation. Codes are send by merchant when a purchase is agreed upon and each codes have a time limit to be used. Customers need to accept this codes and present them to the host computer to complete the payment process. Codes from both merchant and customer are decrypted at the host computer to produce the authenticated instructions for the payment. This invention also employs a unique formula to calculate stored value including in foreign currencies.

18 Claims, 6 Drawing Sheets

METHOD, APPARATUS AND PROGRAM TO MAKE PAYMENT IN ANY CURRENCIES THROUGH A COMMUNICATION NETWORK SYSTEM USING PRE-PAID CARDS

CROSS-REFERENCE TO RELATED APPLICATIONS

Not Applicable

STATEMENT REGARDING FEDERAL SPONSORED RESEARCH OR DEVELOPMENT

Not Applicable

REFERENCE TO A MICROFICHE APPENDIX

Not Applicable

BACKGROUND OF INVENTION

This invention advantageously relates to a method, apparatus and program to make payment in any currencies through a communication network such as a telephone service or data service such as the Internet. This invention relates generally to a telephone payment service in lieu of banking services such as electronic fund transfer and more particularly to a pre-paid card system having a remote terminal such as a phone or data input terminal and host computer with a database for accounts for verification of these cards in pre-paid amounts, transaction codes, payment codes, receipts codes and their respective user/owners.

BACKGROUND ART

The present invention relates to the field of applying pre-paid cards and the option of converting to any currencies for electronic payment through a telephone service or by using a data network. Banks already have facilities such as "Phone Banking" which uses a bank centric network system to do transactions provided one has an account with the bank and money available or with either credit/debit card. Unlike this invention, a debit or credit card is not anonymous. The main difference here is that a prepaid card has anonymity, fixed amount and security over the telephone line or Internet as the case maybe. Moreover, the "actual payment" has already been completed securely with the originator/maker or representative of these pre-paid cards and the transaction payment is merely an electronic order to the maker of these cards to transfer the money to the merchant of choice as stipulated by the user. The case here is that "actual payment" is a physical process and the manufacturer or provider of this service carry equal risk of paying to the wrong party should this system fails. The user has little risk since two codes (one from user and one from merchant) are required to initiate a payment and they have to match. If the merchant of choice has an account within this invention, this in most case is merely an electronic book entry. Withdrawal of actual money can be accomplished by transferring funds electronically or by cheque payment through regular banking system.

The choice of credit/debit cards is also limited by the service only available to merchants. There are many merchants who do not accept such facilities particular given the rising charges. This system also enables users to make payment to non-merchants by transferring the funds directly into the non-merchant accounts. A final point is that this system is instantaneous and there is no waiting period like in a cheque system since all the money is already pre-paid. There is also no exorbitant interest rate as per credit cards facilities. There is no interest for money while stored in the pre-paid card.

Another problem with credit cards in electronic commerce is that it is costly to charge for any amount less than USD 5, which makes "micro-payment" problematic. It is envisaged that micro-payment system, that is charging customers USD 1 to 2 to view documents or information (at least as cost effective as a physical magazine or newspaper) is the future to many of the information service organisations.

At the policy level, credit cards seem to disadvantage merchants as well, since if there is any disputes and where the merchant cannot evidenced a signature, then the bank providing the service will simply favour the client and deduct the amount from the merchant accordingly. While this may be a policy issue between the credit provider and merchant, most merchants will probably maintain a contingent risk fee if the customer is going to charge by a credit card over the Internet to cover the risk of not receiving funds in the event of a dispute.

The current invention is useful because it employed a pre-paid mode, hence money will be transferred to merchant accounts. In this Invention, the only middleman is actually a computer that requires physical input from the client. In the case of a credit/debit card, the card sponsors actually pay the merchant first (hence the credit proposition) and charged the full amount with interest to the client. The credit card allows the client to borrow up to a certain amount. The debit card is similar except the policy is to allow the client to spend up to a certain amount within a certain time and to paid in full the amount at the end of the month. Credit Card Company usually earns the bulk in interest plus principal from their clients while debit card providers earn the bulk from their merchants in terms of fees. However, it should be noted that this difference is not so significant anymore as more and more strategic partnerships are being forged. Therefore unlike credit/debit cards where the minimum base cost is the cost of money over the period to billing, we actually receive money in trust first before paying to another so there are no holding and no default risk cost. Rather we are receiving interest from money in trust.

At the outset, the main problem is how to deposit money in or to convert cash into electronic cash or to digitise it into accounts when there is no banking facility around. For example, to appreciate Phone Banking, one has to open an account with a bank first. Unfortunately, banks are closing doors. This is a persistent problem plaguing isolated areas, which may only have telecommunications facilities but no banks or rather banks find it most costly to operate a physical branch where it is not profitable when the main thrust of business being local merchant transactions only. With rising banking service fees and depositing requirements, marginalised communities may miss out on new challenges such as the fee based information from Internet by simply not able to take part in the transaction side of Electronic Commerce.

Alternatively, the same situation may be faced by Electronic Commerce if there is no physical bank to convert real cash into electronic cash for payment. Some people loathe the idea that the world payment system will eventually be cashless and would prefer maintaining a cross between the two systems. The main excuse is privacy, which is matter of preference. This invention stands in as a solution.

Electronic Commerce means dealing with International Businesses, a need to convert instantly to a foreign currency is paramount as well as the need for secure technology. The problem, with security on the Internet is one of interest. From my recent research, it is shown that the majority of consumers continue to distrust the high-level security hype involved in Internet transactions used to send sensitive information such as one's credit card number. This may be significant since certain high-level security technologies are not easily understood and psychological, we tend to distrust things that we do not understand. Secondly, the level of security provided is dependent on being one-step ahead of the power of computation hence it is not the level of security that is in question but rather the technology available at the time to break the code which is relevant. Thirdly, there are a number of intelligent checking systems employed by Credit Company to detect fraud. Unfortunately the problem with this system is that it might accidentally or by design block a legitimate transaction arising from some dispute in the past. What this means is that if there was any dispute even an innocent one, the card will be blocked forever, resulting in a bad credit report on the user. The credit card industry is very sensitive to Internet Fraud that they are not taking any risks.

By conforming to appreciated methods, this invention solves the perceived insecurity by reversing the roles of merchant to providing payment codes instead of receiving credit card's numbers. Secondly, we also do away with static numbers, so while interception is still possible at this stage but effectively discourage since the data here refers to dynamic and time controlled payment codes rather than static data. The interceptor will need further effort to break down the codes and even if that is successful, it is only one part of the payment process which requires a matching code (under this invention) to execute the payment sequence which is then linked to the actual instrument of payment ie the pre-paid card account. As a further discouragement, each pre-paid card is limited in value to $100 only and hence limit any potential liability to the same amount. If the Internet is being used, this invention has only one Internet gateway for those who might otherwise prefer transferring financial information through the Internet. This is different from a credit/debit card facility where merchants have payment servers built into their sites linking to the Gateway. It is my belief that security breaches happen because of the many gateways or windows in-between the payment servers and intermediaries. In short breaches happen because of the many links between the card acceptor to the payer. In this invention, the merchants have no access to the financial information and in turn, they must generate/sent a payment code instead of receiving financial information. One set of these codes is sent by the merchant system to the buyer in the form of an encrypted email and another to the host computer. For anonymous payment, on receiving this code, the buyer has to log onto the World-Wide-Web site of this Invention (the host computer) to input this code which usually has a timed life. This code will be analysed and matched to the merchant's code and the details of the purchase will be shown for verification. Alternative if he/she has an account or call a special number and follow the instructions to complete the purchase. The buyer will then log on with his passwords. Now if the host computer was able to decrypted the code sent earlier by the merchant computer system, then it would display the payment request in the account of the buyer. The buyer will need to add the code he had earlier received into his account to complete the purchase. The host computer will verify both codes and make the proper payment. The most interesting feature here is that no information is ever allow to be transmitted out from the host computer. Even the email is intercepted, the code is encrypted and of little use. Up to the point where the codes are physically inputted back using computer keyboard or telephone pad and transmitted to the host computer, it has no value at all. For account users, a safety feature here is that only buyers can logon to complete the transaction as the password, computer IP address and telephone number are recorded as well. Another difference with other payment scheme is that the merchant has to actually initiate the transaction first when an invitation has been accepted. This is important since, unlike credit card transactions, the merchant cannot accept any codes and instead has to send codes itself to finalise the transaction. This reversal means, evidence of actual purchase is put into the hands of the buyer since the buyer has to deal with the host computer which makes it easy to establish relationship later.

In contrast with a credit/debit card where one credit cards number is fixed for life and it is possible for crackers to break the code and gain access to ones credit card number or by a means of computer program to second "guess" the credit card number, this invention provides random but verifiable codes for different payments each time. These codes have a life time of usually up to 24 hours.

To process Internet payment, the transaction might involve using a foreign currency. The concept of converting one currency to another is not new, banks, money changers and so on provide this service on a daily basis. When one purchase a pre-paid card in one local currency, one can use it to pay for services denominated in that currency but if it is a service denominated in another currency, then one need to convert it to that currency first. While a credit/debit card facility can provide such a service it is often 'settled' at the rate that the provider of the service consider the most advantages leaving much guesswork by the user of these facilities. In this invention, the user is prompted to the exact foreign currency exchange rate prevailing at that time of initialising the transaction. The user will know exactly how much the conversion rate is and the final amount at that time rather then when the bill arrives. It is then his prerogative to accept or reject this rate and amount. Such prerogative is absent with the use of a credit/debit card. With volatile exchange rate movements, this can be costly.

As mentioned, the spirit of this invention was primarily to find a solution to the problem of banking inactivity in certain communities for various reasons. It is also envisaged that this present invention will be used by local residents who do not have a credit/debit card, checking or savings account with a local bank (either because there is no local bank at their area or it is too far), but nevertheless need to pay some bills and have access to a public/private telephone and/or Internet Access. To economically sustain this invention, 1 to 2 percent revenue can be generated by charging a fee collected when customers pay bills for utilities, such as telephone, electric, gas, and water, as well as other bills, such as cable, television or even credit card bills. Advertising which is played at intervals is another avenue. The system described here operates under contract with the local utilities and companies to provide such a payment service.

It is noted that "money" in the system is stored in two formats. The first being "floating" that is represented by the pre-paid card and the second is "stored" that is when money represented by the pre-paid card has been electronically deposited into the user's account in the host computer. Once money is stored in the user's account, the devising pre-paid card is of no value. Payment can be made at any time using the user account. Payment made from a "floating" position will be anonymous. There is a cost to store digital money in the user's account, which is reflected through several variables presented in a "store-value" formula. The final stage is when the "money" leaves the payment system through a deactivation process and/or by cashing out. There is also a cost associated to deactivating the pre-paid card (if it still represent some money) or electronic money in the account through cash out. Hence in summary, this invention provides a possible solution to combine both on-line and off-line payment opportunities within the same system. Depending on desirability, it also preserves anonymity of the user just like physical money.

This invention is designed for low cost maintenance, high usage and applying available technology with the exception of its decrypting and verifying algorithm in generating purchase codes for its customers and matching code for the merchants. It is targeted at low-income society, which has special needs such as safety features, low cost and almost theft proof. For example when the user purchases these pre-paid cards, a receipt will be issued to them. This receipt contains the details of the pre-paid card such as the serial number, value and time but not the security features, which are stored on the card directly under some scratch-off material. On each card, there are two sets of peel-able bar codes where the user can keep one set for record. The seller need to peel and keep the other set at the point of sale to be recorded in the daily sale record. At the end of the day, the daily sale record is faxed to the manufacturer of these pre-paid cards. Since they contain only bar-readable codes, they will be scanned immediately and information uploaded to the host computer. If these pre-paid cards are stolen then they can be traced quite easily using the above records and even if the owner lost them by accident, the owner can return to the vendor where he purchase these pre-paid cards to check the records to make a cancellation and a new card is provided. Alternatively, the rightful owner can deactivate these pre-paid cards through a request to the host computer since the serial number of the pre-paid card, value and time of purchase are known or at least traceable from the seller within a reasonable time frame. And because each card has a computer generated trial code, even if these cards have been 'use' that is for some service, such payment will be put on hold. Furthermore, if the thief try to use the pre-paid cards through the network of telephones, the host computer will know from which phone the call was made and inform the authorities. If the thief tries to deposit the money stored in the pre-paid card into his own account, then his identity will be known as all pre-paid cards have a unique tracking number and all accounts in the host computer are linked to the identity of their owners. If the thief tries to deposit into another person's account the amount will be negated. There is nothing to prevent the thief from selling the pre-paid cards in the black market but if the card is suspect then the value of such pre-paid card is no more than the plastic/paper it is made from. It is also difficult to counterfeit since no two cards' identity is the same or in sequence. Separate programs are used to assign serial numbers (equivalent bar codes) and security codes with a third program randomly synchronising both numbers to one card. In short, this system is safer than real money since no one can steal or counterfeits them. It is traceable and recoverable. The program is designed as a double entry system where it must receive real money for it to issue a pre-paid card and vice-versa to close an entry. The system is not intended to replace the banking system but serves to supplement certain banking services where the bank no longer provides or regards it as unprofitable. Quite the contrary, banks are suited to be the external link to the system since they can be called on to make payment and receiving wire-transfer to and from this system. For this to be accommodated, back-end integration is required.

In the operation of the prior art system, pre-paid cards are mainly use for telephone services and are already well accepted in the community. The reason for this was mainly because of convenience, zero-administration and lower access fees. Such cards are typically purchased from vending machines or shop keepers and come in fixed value increments, for example, $10, $50. A $10 card provides a customer with a certain number (eg 30) minutes of long distance time from any touch phone telephone to any location in the country or internationally. These cards are batch activated by the card provider in a limited number of predetermined values to make telephone calls. A customer purchases one of these pre-activated cards by paying a fee usually the face value of the card. Similarly, the card typically included a predetermined identification code and a special password code is obscured by a scratch off material. To use the card, the customer accesses the service (usually through an 800-number), enters the identification code (typically obtained from the back of the card), dials the destination number and the call begins. Prior to dialling, the system may inform the user of then-current card balance. If during a call the time remaining on the card is about to expire, the customer may be prompted (through a voice over) that only a certain amount of time remains. When the designated time has expired, the call is terminated. The result scenario is that there is no monthly bills, no surcharges, which fits into our original desire to reduce transaction costs by assuming there are no intermediaries/administration such as banks. It also serves our requirements for digitising cash since when one purchase a pre-paid card, one actually has exchange real cash for electronic cash or received some perceived notional electronic credit in a computing system. And finally, there is no need for a bank to be selling these pre-paid cards.

In a preferred embodiment, a pre-paid card system enables customers to access a telephone network and obtain transaction services such as paying for water, gas, electricity or services other than making a phone-call. The system includes seven main functional components: a plurality of pre-paid cards, a host computer, a call processor, a programmable database containing unique customer's account numbers/pre-paid cards security tag, unique formulae to calculate the cost of stored value and a currency conversion utility with matching interest rates and a security based algorithm to generate, encrypt and decrypt payment codes, serial codes, security codes.

Each of the pre-paid cards preferably includes a body portion and several security features such as security number imbedded under some scratch-off material. There shall be two sets of peel able standard readable barcode shown on the card. The card is typically formed of plastic or cardboard. The main management and processing of the system is effected by the host computer, which is connected to the telephone network or over the Internet. The host includes a database for storing number accounts of individuals or corporations, these accounts include private passwords to enter the system, the account balance of these accounts, the activation and security associated with the pre-paid cards, the security trials number for transaction after activation, payment codes and receipt codes. The call processor is controlled by the host computer for interfacing one of more customers to the telephone network using the authorised pre-paid cards. A different interface is through the World Wide Web which is controlled by the host computer replicating the process of accepting payment request.

The system should also include a general accounting and billing information so that system operator can determine which point of sale operator has sold and deactivate a particular pre-paid card. This enables the system operator to reconcile all transactions at the end of the day.

The below has outlined some of the more pertinent objects of the present invention. These objects should be construed to be merely illustrative of some of the more prominent features and applications of the invention. Applying the disclosed invention in a different manner or modifying the invention as will be described below can attain many other beneficial results. Accordingly, referring to the following Detailed Description of the preferred embodiment may have other objects and a fuller understanding of the invention.

OBJECTS OF INVENTION/SUMMARY OF INVENTION

The Inventor has developed a method of utilising a telecommunications system with a host computer which is linked to a public telephony system network and through the Internet where applicable. The system interface is linked to a call processor such as an "Interactive Voice Response system" and to the World Wide Web. The program for this system is written in Visual C plus plus language running on Windows NT Server. The heart is a database engine such as Microsoft SQL Server 7.0 or Oracle 8i. Included in the systems are Microsoft Exchange, IIS, SMTP and Index Server for Internet capabilities.

Thus according to one embodiment of the invention there is provided,

A call process system comprising:

Receiving an incoming request from a user through the public telephony System network via a modem or any connecting interface suitable and secured for this purpose, Upon checking the calling number or IP address and recording with a time stamp, Respond with the appropriate welcoming message or advertising messages, Provide menu prompts to input either pre-paid card number or account number, Upon receiving activation info and security info from user, host computer will authenticating the pre-paid cards by checking against the codes and authorising them as "floating" and menu prompt, Upon receiving account number and password, provide account user with account balance information and menu prompt, Inputting queries and wait for a response Upon receiving payment code, decrypt the code to provide merchant's identity and amount, Check whether pre-paid card or account has sufficient to pay Provide advertising messages while it waits for a response from the user or computer, where advertising is audio for phone and visual for computer interface, Prompted the user with the information provided After inputting and registering the desired information either through the touch-tone method or direct voice method or keyboard, this will be then sent to the central controller inside the host computer for processing. The sending process is through a telephone line or network of on-line computers for the Internet. The central controller will process the information and sent a reply/response through the same way back to the user. The above process is repeated again until the user is satisfied with his results unless security features are present to prevent abuse.

It is an object of this invention to provide a pre-paid card system to pay both local/foreign services providers and receive funds by providing the method, apparatus and accounting program for transferring electronic credits into numbered accounts and into any currencies through a communication system in lieu of a banking facility.

It is yet another object of the present invention to provide a pre-paid card system where it can perform payments or receivable transactions in any currency by assigning each transaction a purchase code and executing the final payment process over a communication network.

It is still another object of the invention to provide a pre-paid card system wherein each authorised card has an enabling security code associated therewith for a host computer to track usage and for deactivation purposes.

It is still a further object of this invention to provide a pre-paid card system wherein the host computer maintains a database of authorised cards accounts, the database contains detailed information about where the card was sold, by whom, the amount that was sold, the time of the transaction, transactions made from this amount, updates this balance at the time of a transaction and present the status of each card in the system. The host computer will also maintain a database of user accounts, which are linked to the pre-paid cards with amounts being credited or debited in the system. These numbered accounts belong to either individuals or corporations and are duly authorised though a prior agreement between the pre-paid cards provider with the individuals or corporations.

The core of this invention is the availability of the accounting system which requires double entries to make it possible for transactions such as payment, be made from one individual to another. For this purpose, the accounts are simply defined as "stored". These accounts have predefined calculated stored value achieved by a formula. This formula includes factors such as frequency used, cost of funds, period and currency.

To ensure further security, it is still an object of this invention to incorporate a point of sale terminal to include a database use to keep track of the cards sold, the amount, the time of sale and deactivation of a particular card. The point of sale terminal can also accept payment and make payment since it has a direct credit or debit facility linked to its account in the system. Given today's sophisticated cashier machine, this is well within the elements proposed. The point of sale terminal need to sent this accrued information to the host computer 3 times a day through a modem linked up to the system to limit running cost. The host will then match off those cards that are sold and activated. This is an audit function and not authorisation process of the system. Alternatively, the simple peeling of peel-able bar-codes from the pre-paid cards at time of sale and aligning them according to a prepared table and later faxing this to the host computer is acceptable (See FIG. 6).

To ensure further security, it is still an object of this invention to incorporate unique payment codes, which are issued only at the time of a purchase by the merchant. These codes are sent separately to the user/buyer and to the host computer. Once the host computer receives this code, it will stored this code and wait for the prospective buyer to check into the system to input the buyer's payment code as provided by the seller. Both codes are then checked together by a unique set of algorithm to authenticate the seller and if it matches, the user can proceed to make payment using the pre-paid card or from the user's stored account and a receipt code is given.

It is also an object of this invention to able to play audio/visual advertising material while it is processing a command request. The host computer will store all inputted data and maintain a database for all actions taken during the process and those instructed by the users, for example making a payment to a certain company, recording the transaction, time, amount and replying back to the user with a receipt number. This step is important in the event of a dispute so that each step can be traced to provide evidence. For the Internet user where it is permitted, we will be using a screen-capturing feature, which records all the screens shots shown at the user's monitor.

In accordance with the preferred embodying this invention, an audit trail for a pre-paid card transaction is created by storing security code of the pre-paid card and providing a transaction identification tag to link the security code of the pre-paid card at each transaction.

In accordance with another object of the invention, the method and apparatus provide for the wire transfer of funds to a transferee over this network. In order to carry out the wire transfer, the user enters his own account number and password and the account number of the person who is to receive the wire transfer. Preferably, a receipt code is issued to the user. In the preferred embodiment of the invention, the actual payment for the wire can be seen as a mere book transfer between two accounts, that is debiting the user and crediting the recipient's account and once this is completed, the user will be given a receipt number by the host computer and the host computer will dial the recipient's telephone number (if any) to inform the recipient of 'new developments' in his/her account. Alternatively, an email can be sent. The latter is optional and of course a fee will be charge for this service.

In accordance with still further embodiment of the invention, the pre-paid cards and apparatus allow the payment of invoices or bills owed by the user after having been qualified as a user by registering into the system.

DETAILED DESCRIPTION

With reference to the attached drawings, several embodiments of the present invention will now be described in detail.

Figure 1:
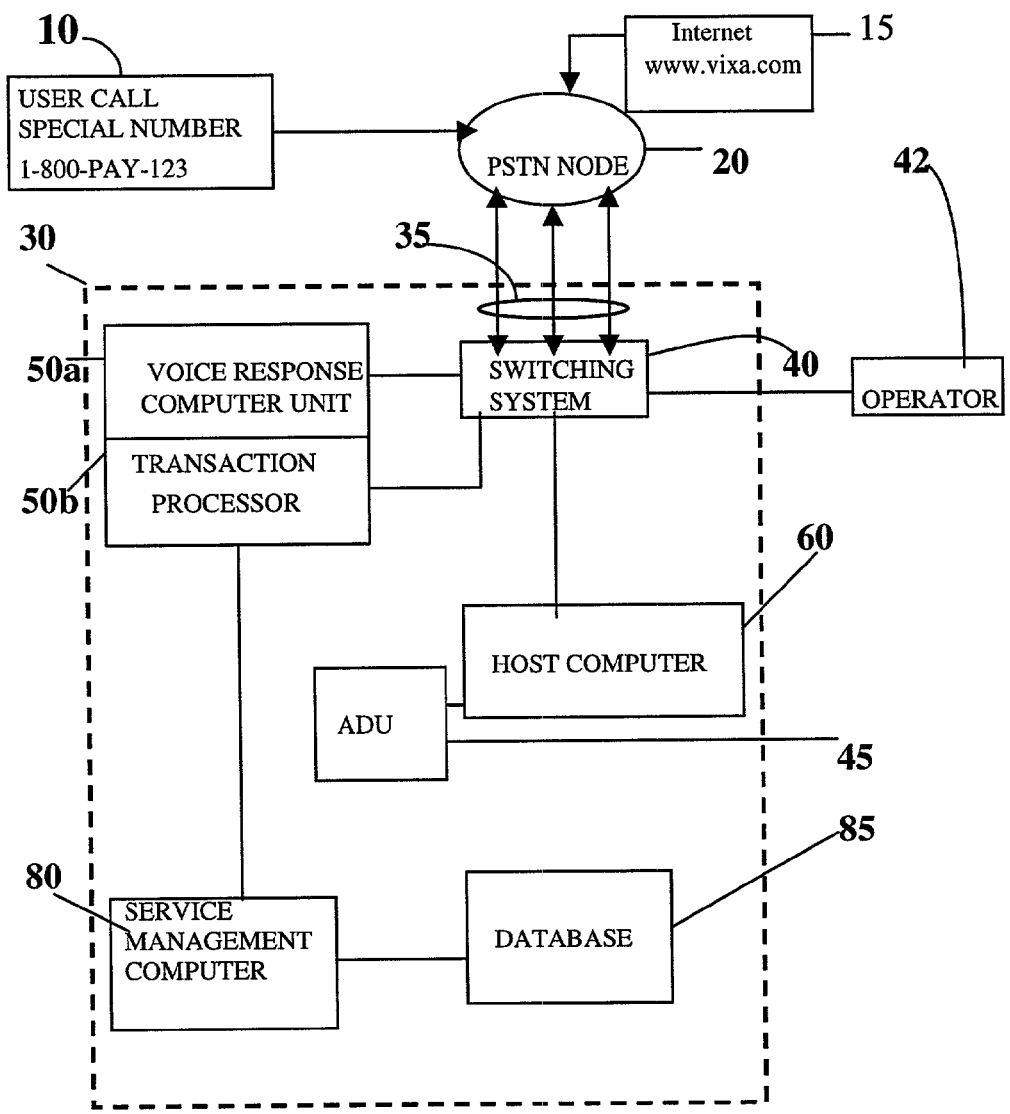
FIG. 1 illustrates the circuit design linking to a public switch telephone network in accordance with the pre-paid card and service of the present invention.

FIG. 1 shows an example of circuit architecture which constitutes an example of the pre-paid card system in accordance with the present invention. The system permits the user to make a telephone call to make a virtual payment without the need for the caller to have a large supply of currency or go to a bank or have a particular credit card thereby maintaining existing paid phones to be used. The party is connected to the called number through one or more nodes in a public switched telephone network (PSTN). FIG. 1 shows an interaction between an end user or party 10 with one PSTN node 20. The node 20 may comprise a telecommunications switching system located in a central office.

In addition to the network node 20, the architecture of FIG. 1 includes a platform 30 connected to the network node 20. The platform 30 may be co-located with the network node 20 or remotely located with respect to the node 20. The platform 30 contains an end office digital switching system 40 connected to the network node 20 via one or more central office trunk facilities collectively designated by reference numerical 35. For example, the switching system 40 may be connected to the central office switching system in node 20 by one or more conventional T1 trunks, ISDN channels, or analogue lines, as needed. The switching system 40 performs call/data interfacing functions for telephone calls or data signals between the platform 30 and the network node 20. The call/data interfacing functions of the switching system 40 are controlled by a host computer 60 and serves as a direct link to the outside world. An Automatic Decoding Unit (ADU) 45 interacts with host computer 60 to automatically decode all payment and/or merchant codes received before sending it for verification and authorisation. A human operator 42 may also interact with the switching system 40. It is to be understood that a back-up switching system, host computer, and database may also be used to serve as redundant systems in the event of primary system failure. The pre-paid card service platform 30 also contains an Interactive Voice Response Computer (VRC) 50a and a Transaction Processor (TP) 50b which performs voice response and text input response functions respectively related to user account verification, pre-paid card authentication and activation and payment etc. The VRC 50a communicates with the caller to by providing a menu prompt system and assist the caller in reaching the desired functions. TP 50b communicates with the external data terminal by providing a World Wide Web server page with a menu interface and assist the user in reaching the desired functions. Typically, the user can communicate by entering the Universal Resource Locator (URL) into the browser software connecting the World Wide Web such as www.vixa.com 15. In cases where it is difficult to input the alphabets, voice recognition technology will be employed. We assume that one day all computer system will be using such technology. Both VRC 50a and TP 50b are primarily use to interact with users and connected to the switching system 40 through appropriate communication lines. The only difference between the two is the type of devices being used by the user, which is either through a telephone or a data terminal over the Internet 15. The architecture of FIG. 1 also contains a service management computer 80 which manages the entire card database 85 containing relevant information about each outstanding card such as the current balance for each card, the user's accounts, advertising files and trail codes for each transactions. This is where all the information for this system is kept and linked to the host computer. In addition to managing the card database 85, the service management computer 80 also performs operations, administration, and maintenance (OA&M) operations for the platform 30.

It is to be understood that redundant systems may also be used to back-up each of the aforementioned elements of FIG. 1.

Figure 2:
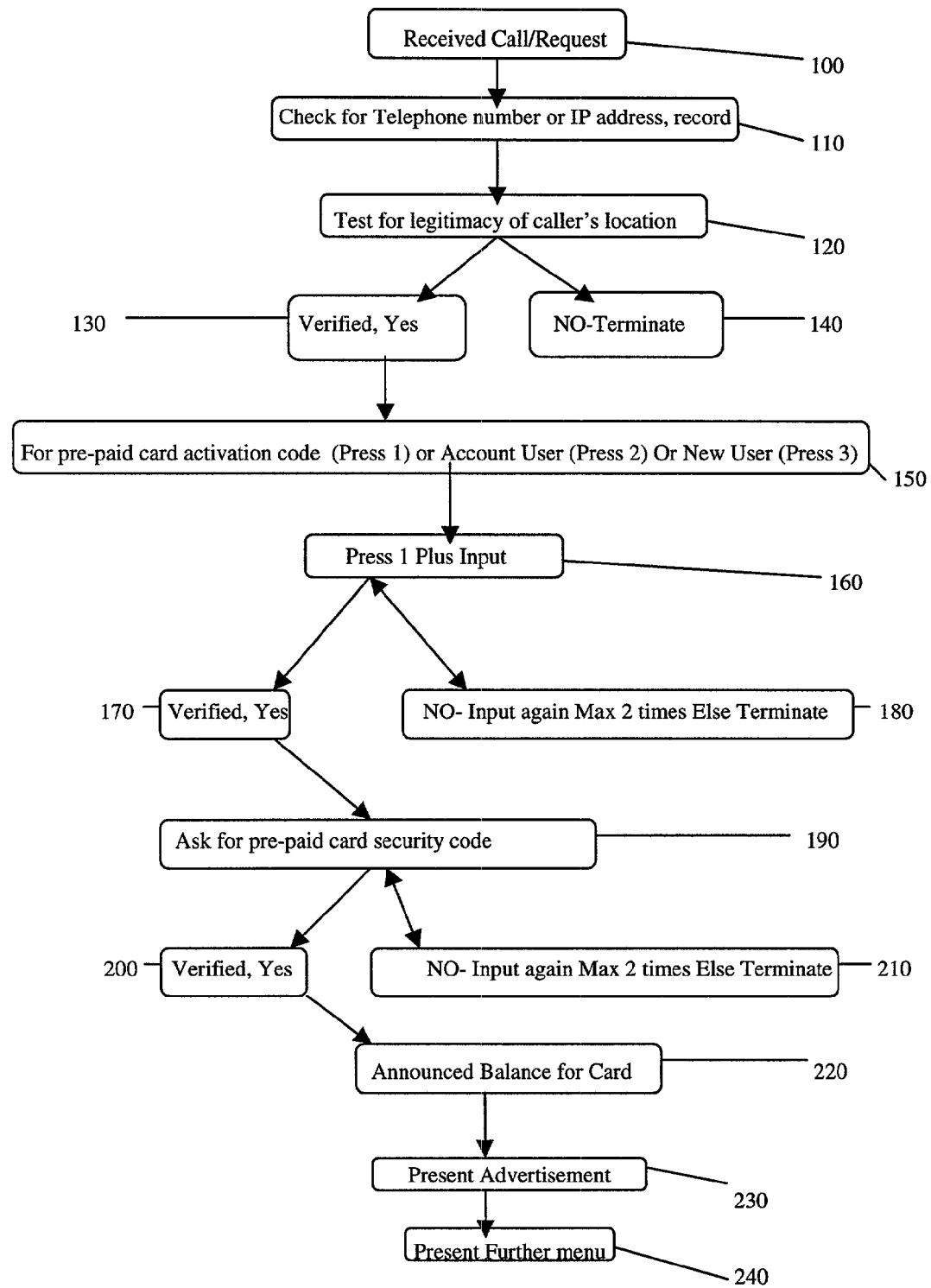
FIG. 2 is a flowchart outlining the process of one embodiment of the initialisation process in accordance with the present invention.

With reference to FIG. 2, the following description of an initialisation flow represents the caller's interaction with the pre-paid service. At step 100, the caller enters a network access telephone number, such as 1-800-PAY-123. The system checks for number or IP integrity it is being called through a data gateway which could have originated from the Internet. If this is verifiable then it will provide a menu at step 150. In this FIG. 2, it is shown the sequence for accepting a pre-paid card. At step 160, the system prompts the caller to enter some form of activation code. If this is verifiable, it will ask for the security code at step 190. If this is verifiable, it will then announced the card balance at step 220 which will be followed by some advertisement at step 230 and finally at the main menu at step 240. The whole process should no take more than 4 minutes and all steps are timed.

Figure 3:
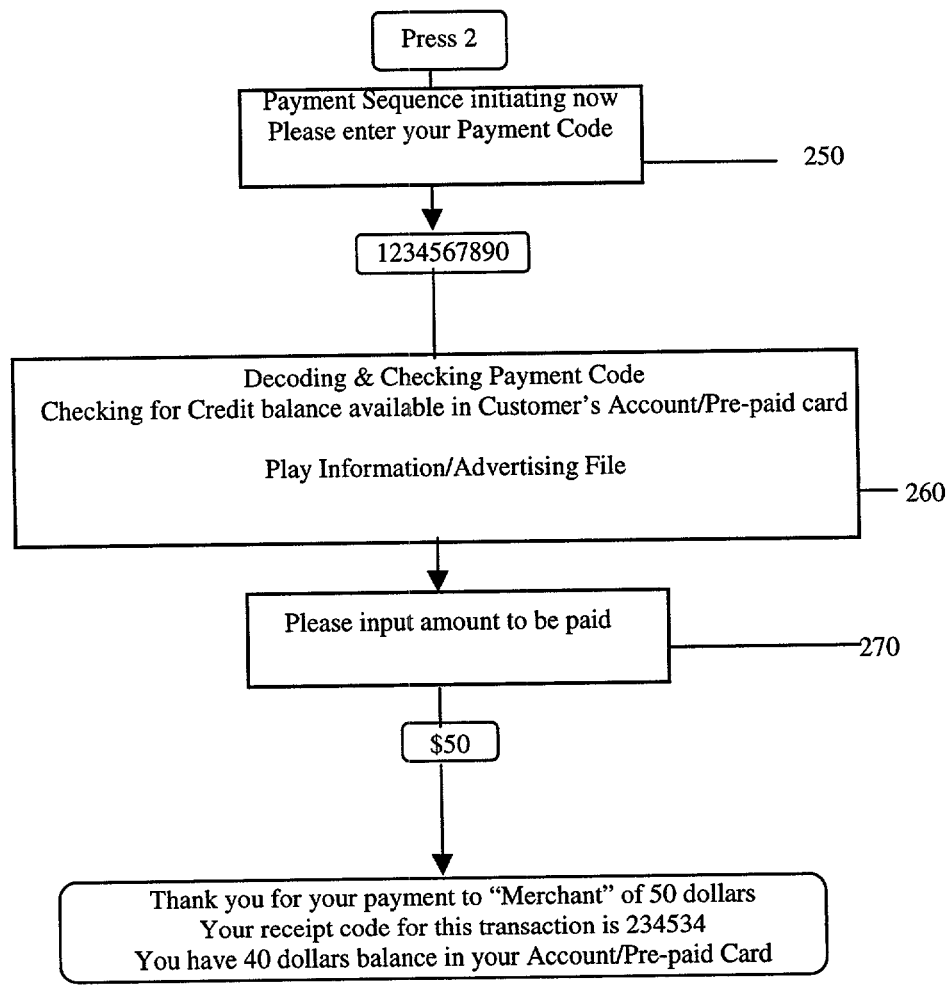
FIG. 3 is a flowchart illustrating embodiment of the "payment option in local currency" in accordance with the present invention.

In FIG. 3 at step 250, the user is prompted for the payment code. Each payment code sent to the customer/user is unique and is linked to the customer's name or address or whatever data that was inputted earlier by the customer. At step 260, on inputting this payment code, the Automatic Decoding Unit (ADU) 45 interacts with host computer 60 to automatically decode any payment codes received. First it will combine the code with the merchant's code which was sent to the platform 30 at the same time. It will then run a complex decryption process to ascertain the authority of the codes. Both codes will reveal, the payment status including amount and delivery mode. It will check to see if the customer's payment code refers to any of its existing customers in the database. If it is not, it will prompt the user to enter the pre-paid card as per in FIG. 2. If the user is an existing customer in the database, then host computer 60 will do a further check to see if there is sufficient funds to complete the payment process. If there is insufficient, host computer 60 will prompt the user to enter the code for the pre-paid card as per FIG. 2. It is envisaged that some users may wish to make partial payment such as for electricity and necessity where such authority has been given. Such is permitted. In any event, in step 260, advertising information will be played while waiting for a response. At step 270, the user is prompted to enter the amount he wishes to pay which may be the full amount or less. At step 280, the amount is accepted and a receipt code is announced for audit and verification.

Figure 4:
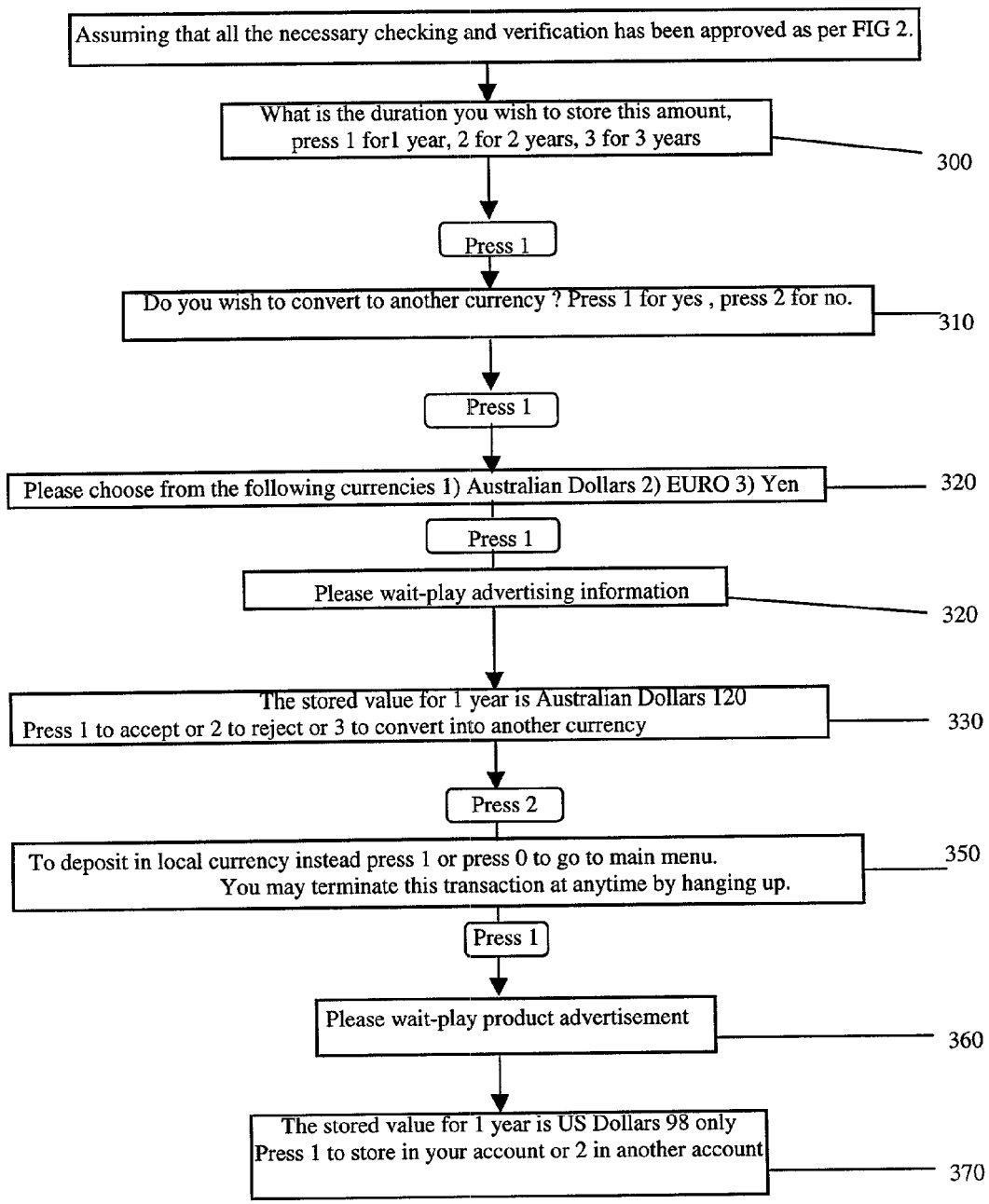
FIG. 4 is a flowchart illustrating another embodiment of the "storing value in foreign currency" in accordance with the present invention.

In FIG. 4, the menu include not only payment but also storage of the value in a different currency for later use. At step 300, it asks for the duration to store the amount. This duration is flexible and allows the longest time to store in the system. The downside is that the longer it is, the higher is the storage cost for the user. At step 310 by default, the system asks whether the user wants to store in a different currency. It then presents a number of available currencies at step 320. After user input the desired currency, at step 330, advertising information will be played while the amount is being calculated including the duration to be stored. It then presents the value/result to the user and asks whether it can be accepted at step 340. If the user decided not to accept as in FIG. 4, then user need to press 2 to reject on the phone. This brings up a different step 350, which by default brings the option back into local currency. Again taking the former value of 1 year, the system calculates again and presents the value for local currency at step 370 and ask for whether to store in ones account or transfer to another. While waiting step 360 plays product advertisement.

Figure 5:
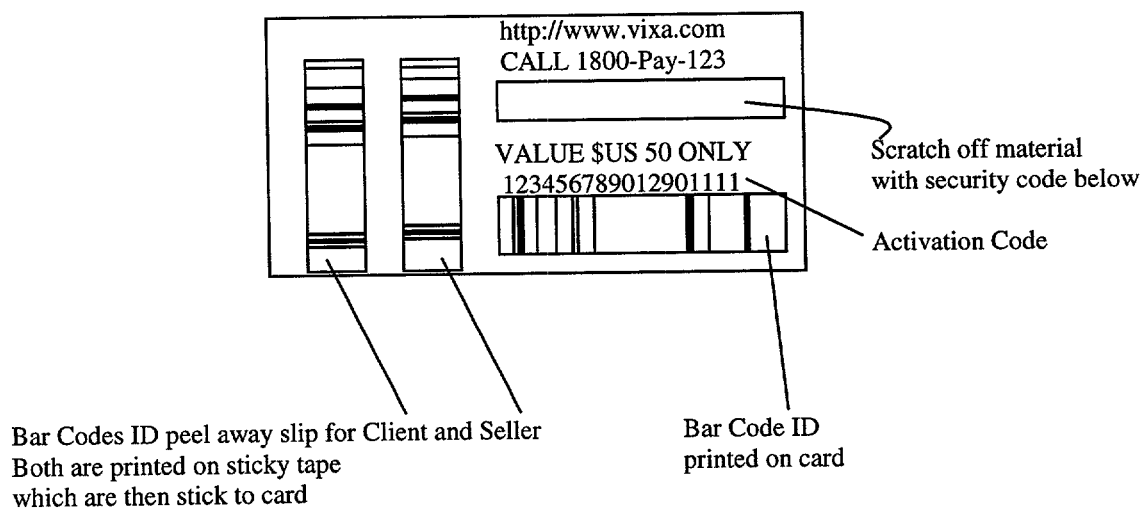
FIG. 5 is an illustrating the pre-paid card in accordance with the present invention.

FIG. 5 shows the pre-paid card, which has one unique feature, which is the peel-able bar codes one for the seller, and one for the client. As mentioned this invention is designed to operate at minimum cost but with the same level of security found in more expensive system. The peel-able feature is used together with FIG. 6 to submit to the host computer, as a double check of the cards, which are being circulating in the market. It helps in tracking these cards and in the event of a card being stolen, it can be traced quite easily given these records where one remembers the date/time of purchase and the seller's shop or by presenting the other bar-code which is usually kept separately by the user. Otherwise, the features found in this pre-paid card is similar to existing cards.

Figure 6:
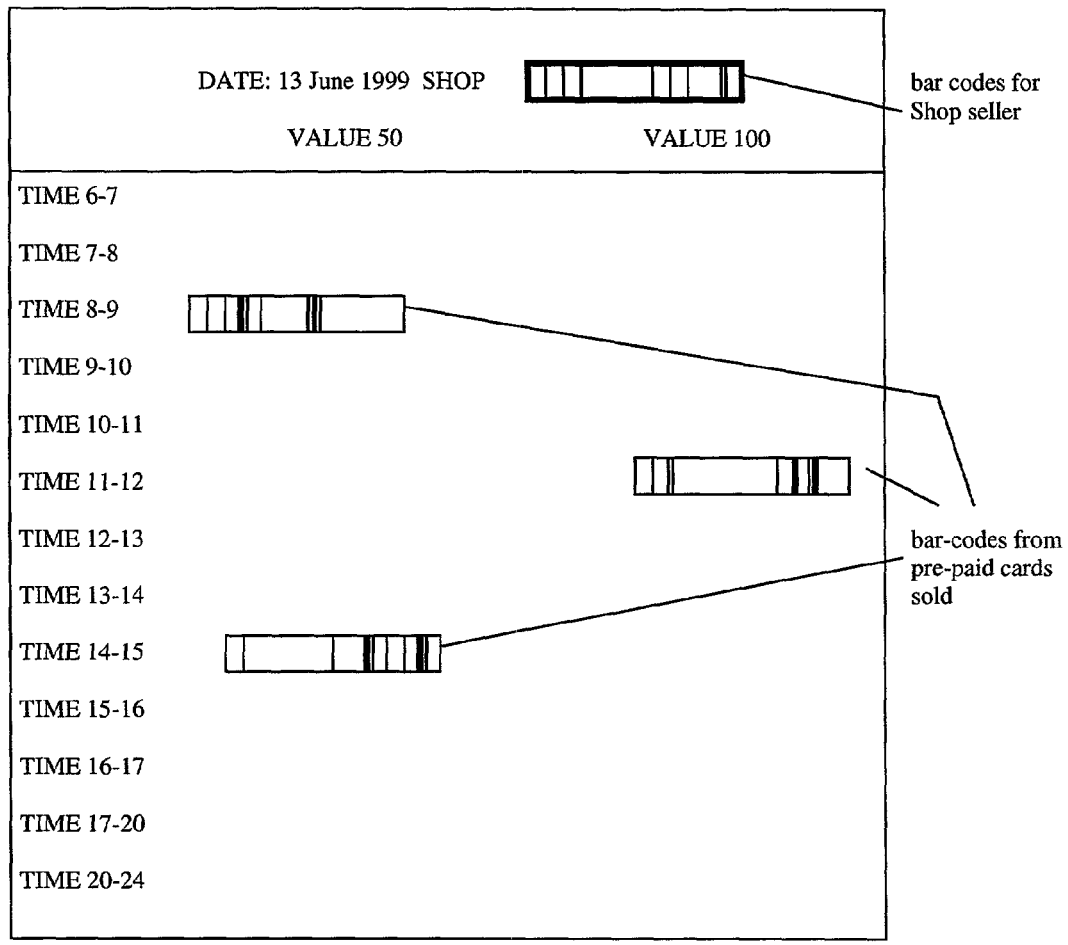
FIG. 6 is an illustration of the table for faxing "used pre-paid cards' codes" in accordance with the present invention.

In FIG. 6, shows the special form where the peel-able codes are pasted at the time of sale. As mentioned previously while sophisticated cashier machines can read the bar code and record the sale, such information is still require to be updated at the main system. Such updating can be done by direct computer to computer upload which requires modem communication and some computing skills as well. Alternatively, using the special design form adapted here, the seller which is a typical store owner can easily sent this as a fax to the computer. At the receiving end, the fax is being feed in directly by digitising the information. Depending on where the peel-able codes are placed on the sheet, the computer can determine the time and identity of the card as well as the shop that sold it. All this information is then check against the database. By using this process, we will be able to target smaller shops as well and increase the usefulness of this system at lower cost.

It should be noted above that the Figures shown here are based on the Interactive Voice Response Computer (VRC) 50*a* interacting with the user over a telephone. As for the Internet framework, a similar interactive process based on the above but using text and voice is used.

The two main distinguishable features of this system is the stored value calculation for local and foreign payment process and the security impact which reverses the role of providing codes from customer to merchant.

As the case maybe, the calculation of the stored value may be determined by multiplying a base price B by these factors. The variables used to calculate the stored value from the base be continuously or discretely variable. One set of discretely varied variables is described in the table below. There are according to this invention many ways of calculating the value and as such these methods are only for demonstration purposes.

In my final product, a combination of a few of the methods will be applied. In the final analysis, those most responsive will be adopted and refine while those which are not will be abandon.

D A factor relating to the number of years before expiry of pre-paid card. In this example D decreases as the number of years increases

| | |
|---|---|
| 1 year | 1.0 |
| 2 years | 0.98 |
| 3 years | 0.95 |
| 4 years | 0.93 |
| 5 years | 0.90 |

L A factor related to the value and loyalty of customer that is based on his/her past purchases of pre-paid cards.

| | |
|---|---|
| High Demand with purchases over $1500 a month | 1.1 |
| Medium with purchase over $500 a month | 1.0 |
| Low demand with purchase less than $499 a month | 0.97 |

C A factor relating to the cost of money. (Current interest rate less 100) so if the current local preferred currency's interest rate is 5 percent per annum, then the value is 0.95 or whatever equivalent to the foreign currency's interest rate if foreign currency is requested which if it is Australia Dollar is also 5 percent.

R A factor related to the flexibility of the customer's purchase plans, that is he/she intends to buy local goods in local currency or might use it for International purchase such as using another currency.

Flexible (ie wish to purchase goods in any currencies) This factor is linked to the daily exchange rate of a particular selected currency, in this example, we will use the Australia Dollars at 1.42. The host computer will prompt the user to the currency the user desire.

| | |
|---|---|
| Not Flexible (ie wish to purchase goods in local currency only) | 1.0 |
| Otherwise the exchange rate of the desired currency | 1.42 |

Using these variables, a suitable algorithm for calculating an appropriate value is as follows:

$$\text{Stored value} = B*D*L*C*R$$

For example: A one year pre-paid card with face value B of $100 (US Dollars) will have a stored value of 100*1.0*1.1*0.95*1.42=$148.39 (Australian Dollars) for 12 months.

More sophisticated formula may be used to arrive at a suitable stored value.

The example above, assume a customer wants to purchase a $100 pre-paid card. Further assume that he expects to use it within 1 year from now (D) 1.0, he is an excellent card user (L) of 1.1 (This is determine by the computer by checking his purchase and transaction records stored in its database), Interest rate (C) 0.95 is quoted for Australian Dollars, he wants it to be in Australian Dollars (R) 1.42.

The encryption/decryption for payment codes and merchant identification.

There are according to this invention many ways of performing these process. For example, each merchant is assigned a unique merchant number that is known only to the host computer. For example in this case, let us assume the merchant's number is 1234567878907. Now at the merchant's computer it will generate a payment code to the host computer and to the buyer. The buyer need to use this code to finalise the purchase. The host computer in this case will add up both numbers generated by the merchant's computer and the answer must be equal to 1234567878907 or with the format X+Y (X and Y being the unknowns and generated by merchant computer) must be equal to 1234567878907. In this context, the arguments take the shape of addition with two generated variables only. There can be many variables or sub-variables in the verification formula. The merchant's computer is running a program that generates codes which only the host computer can recognise.

Industrial Application

This system according to the invention possesses several advantages over existing arrangements in reducing the cost of transactions and provides a service where there are no banking facilities. It also provides for a way where audio advertisement may be heard while the transaction is being processed through the telephone. Such service may be interactive as well depending on the client's requirements.

Furthermore it functions as a cost efficient currency converter and a reliable form of payment in addition to those currently used such as credit/debit cards which can be used for Internet purchasing. Moreover, this structure is less administratively consuming since the point-of-sale is managed by a self employed person such as those found at grocery stores where this service forms part of his service to regular clients contrasting with a traditional bank where, its main business is to deal with money only. Most of the interaction/services are performed by the users themselves with the host computer as its guide and executioner. As this is an interactive system, the users will always have control and can determine when they want to initiate a transaction, how much to take and when to stop. There will be some form of security and safety control within the system design to prevent abuse or cracking of the host system.

While the present invention has been described above in terms of specific embodiments, it is to be understood that the invention is not limited to the disclosed embodiments. On the contrary, the present invention is intended for various modifications and equivalent structures included within the spirit and scope of the appended claims.

I, the inventor claims:

1. An user to user payment method over a network under payer's control, comprising:
providing an Internet System connected to a host server having a database to transfer stored funds in any currencies over said network, said method comprising:
said host server prompting payer to input payer's account identifier and password;
said host server authenticating the payer's account identifier and password for validity;
said host server prompting the payer to input payee's account identifier and fund transfer information;
said host server receiving said payee's account identifier and said fund transfer information;
said host server upon authenticating the payee's account identifier, instantly crediting the fund to the payee's account upon determining balance in the database associated with the payer account identifier and password is more than the fund for transfer;
said host server instantly debiting the balance associated with the payer's account identifier and password in the database with said fund transferred to said payee's account;
whereby said stored fund is deposited from a prepaid card into an account linked to an user created identifier; and
whereby said transfer is made without interacting with said payee and independently of said prepaid card.

2. The method of claim 1 includes further method comprising:
prompting user to enter security code associated with the prepaid card;
receiving the security code;
determining the security code is valid;
determining any account identifier is associated with the security code;
upon determining there is no account identifier associated with said code then prompt said user to enter an user account identifier, password, storage period and currency to be stored;
receiving said user account identifier, password, storage period and currency as inputted by said user;
determining said user account identifier and password for uniqueness against other stored user account identifiers and passwords;
calculating stored value;
output the stored value to said user;
upon determining said user account identifier, password combination is unique and the stored value is acceptable to said user then add said account identifier and password into database linked with the stored value amount;
upon determining said user account identifier, password combination is not unique and stored value is acceptable to said user then linked the stored value amount to said existing user account identifier and password in the database; and
whereby upon completion of storing and linking said prepaid card is valueless.

3. The method according to claim 2, wherein calculating stored value is based at least in part on the formula below:

$$\text{Stored value} = B*D*L*C*R$$

Where B is face value of the prepaid card or floating balance whichever is less, D is a factor related to storage period, L is a factor related to value and loyalty of customer that is based on his/her past purchases of prepaid cards, C is a factor related to cost of money and R is a factor related to flexibility in currency stored.

4. The method according to claim 1 whereby said payer is unknown to said host server.

5. An Internet system for user to user fund transfer over a network comprising:
a host server having a database to transfer stored funds in any currencies under payer's control, wherein said server having a processor and non-transitory memory operatively coupled to the processor and having codes stored therein when executed the processor causes said host server to perform steps comprises:
prompt payer to input payer's account identifier and password;
authenticate the payer's account identifier and password for validity;
prompt the payer to input payee's account identifier and fund transfer information;
receive said payee's account identifier and said fund transfer information;
authenticate the payee's account identifier and upon authentication, instantly crediting the fund to the payee's account upon determining balance in the database associated with the payer account identifier and password is more than the fund for transfer;
instantly debiting the balance associated with the payer's account identifier and password in the database with said fund transferred to said payee's account;
whereby said stored fund is deposited from a prepaid card into an account linked to an user created identifier; and
whereby said transfer is made without interacting with said payee and independently of said prepaid card.

6. The system of claim 5 further comprising:
prompt user to enter security code associated with the prepaid card;
receive the security code;
determine the security code is valid;
determine any account identifier is associated with the security code;
prompt said user to enter an user account identifier, password, storage period and currency to be stored upon determining there is no account identifier associated with said security code;
receive said user account identifier, password, storage period and currency as inputted by said user;
determine said user account identifier and password for uniqueness against other stored user account identifiers and passwords;
calculate stored value;
output the stored value to said user;
add said account identifier and password into database linked with the stored value upon determining said user account identifier, password combination is unique and the stored value is acceptable to said user;
link the stored value to said existing user account identifier and password in the database upon determining said user account identifier, password combination is not unique and stored value is acceptable to said user; and
whereby upon completion of storing and linking said prepaid card is valueless.

7. The system of claim 6 wherein calculate the stored value is based at least in part on the formula below:

$$\text{Stored value} = B*D*L*C*R$$

Where B is face value of the prepaid card or floating balance whichever is less, D is a factor related to storage period, L is a factor related to value and loyalty of customer that is based on his/her past purchases of prepaid cards, C is a factor related to cost of money and R is a factor related to flexibility in currency stored.

8. The system according to claim 5 whereby said payer is unknown to said host server.

9. A non-transitory computer readable storage medium storing codes that, when executed by a computer to perform steps comprising:
prompt payer to input payer's account identifier and password;
authenticate the payer's account identifier and password for validity;
prompt the payer to input payee's account identifier and fund transfer information;
receive said payee's account identifier and said fund transfer information;
authenticate the payee's account identifier and upon authentication, instantly crediting the fund to the payee's account upon determining balance in the database associated with the payer account identifier and password is more than the fund for transfer;
instantly debiting the balance associated with the payer's account identifier and password in the database with said fund transferred to said payee's account;
whereby said stored fund is deposited from a prepaid card into an account linked to an user created identifier; and
whereby said transfer is made without interacting with said payee and independently of said prepaid card.

10. According to claim 9 further comprising:
prompt user to enter security code associated with the prepaid card;
receive the security code;
determine the security code is valid;
determine any account identifier is associated with the security code;
prompt said user to enter an user account identifier, password, storage period and currency to be stored upon determining there is no account identifier associated with said security code;
receive said user account identifier, password, storage period and currency as inputted by said user;
determine said user account identifier and password for uniqueness against other stored user account identifiers and passwords;
calculate stored value;
output the stored value to said user;
add said account identifier and password into database linked with the stored value upon determining said user account identifier, password combination is unique and the stored value is acceptable to said user;
link the stored value to said existing user account identifier and password in the database upon determining said user account identifier, password combination is not unique and stored value is acceptable to said user; and
whereby upon completion of storing and linking said prepaid card is valueless.

11. According to claim 10 wherein calculate the stored value is based at least in part on the formula below:

$$\text{Stored value} = B*D*L*C*R$$

Where B is face value of the prepaid card or floating balance whichever is less, D is a factor related to storage period, L is a factor related to value and loyalty of customer that is based on his/her past purchases of prepaid cards, C is a factor related to cost of money and R is a factor related to flexibility in currency stored.

12. According to claim 9 whereby said payer is unknown to said host server.

13. The method of claim 1 includes providing at least one point of sale terminal adapted to issue by printing a receipt representative of the prepaid card having at least a serial number.

14. The system of claim 5 includes at least one point of sale terminal adapted to issue by printing a receipt representative of the prepaid card having at least a serial number.

15. According to claim 9 further comprising:
enable at least one point of sale terminal to be connected to said host server to issue by printing a receipt representative of the prepaid card having at least a serial number.

16. The method according to claim 1 whereby said prepaid card is a cash card.

17. According to claim 5 whereby said prepaid card is a cash card.

18. According to claim 9 whereby said prepaid card is a cash card.

\* \* \* \* \*